United States Patent [19]

Kurasawa

[11] 3,887,819

[45] June 3, 1975

[54] SAFETY DEVICE ACTUATING ARRANGEMENT

[75] Inventor: Yoshiya Kurasawa, Yokohama, Japan

[73] Assignee: Nissan Motor Company Limited, Yokohama, Japan

[22] Filed: Sept. 25, 1973

[21] Appl. No.: 400,615

[30] Foreign Application Priority Data
Sept. 26, 1972 Japan.............................. 47-112123

[52] U.S. Cl................ 307/10 R; 180/91; 340/52 H; 280/150 AB
[51] Int. Cl............................................. B60q 1/52
[58] Field of Search............ 307/10 R, 121; 180/91, 180/103, 82; 340/262, 52 H; 280/150 AB; 102/70.2

[56] References Cited
UNITED STATES PATENTS

| | | | |
|---|---|---|---|
| 3,495,675 | 2/1970 | Hass et al. | 180/103 |
| 3,750,100 | 7/1973 | Ueda | 340/52 H |

Primary Examiner—Herman Hohauser

[57] ABSTRACT

An arrangement for actuating one or more motor vehicle safety devices in a collision with an obstruction. The arrangement includes an impact or deceleration sensing switch for connecting safety device actuators to a power source when an impact or deceleration rate greater than a predetermined magnitude is sensed, and a mechanical pressure sensing switch for rendering the actuators inoperative as long as no mechanical pressure is applied thereto.

1 Claim, 4 Drawing Figures 3,887,819

SAFETY DEVICE ACTUATING ARRANGEMENT

The present invention relates to safety devices and, more particularly, to an actuating arrangement for actuating a safety device installed in a motor vehicle.

Motor vehicle safety devices generally use inflatable protector bags or stretchable protector nettings which are usually stowed in deflated or collapsed conditions when they are held inoperative. The protector bags or nettings are connected to suitable actuating means or arrangements which are adapted to actuate the protector bags or nettings into protective positions as soon as a collision of a motor vehicle occurs. The protector bags or nettings thus brought into the protective positions intervene between the vehicle occupants and relatively hard structural parts of the vehicle cabin such as a windshield, instrument panel, steering wheel and column, seat backs and so on. The vehicle occupants who are violently flung or bounded around during the collision are relatively softly received by the thus actuated protector bags or nettings to absorb a large proportion of the energy of impact on the vehicle occupants and the vehicle occupants consequently are protected from incurring serious injuries. For the purpose of providing full assurance of protection of the vehicle occupants during the collision, it is of critical importance that the protector bags or nettings be brought into the protective positions as rapidly as possible after the collision has incipiently been encountered. A typical prior art actuating arrangement for the motor vehicle safety devices of any type, therefore, includes an actuator for initiating action of the safety device when it is energized, a power source, and an impact detecting switch for electrically connecting the actuator to the power source for energizing the actuator when it detects a deceleration rate above a predetermined magnitude due to collision between the motor vehicle and an obstruction. The prior art actuating arrangement mentioned above is advantageous for its relatively simple construction and low manufacturing cost.

In spite of this particular advantage, the actuating arrangement is not fully acceptable for use in the motor vehicle safety device because it is liable to erroneous operation when the motor vehicle is subjected to a great braking force. The erroneous operation of the actuating arrangement causes the protector bags or nettings to be unnecessarily brought into the protective positions. The unnecessary action of the protection bags or nettings causes the occupant to incur injuries or to obstruct the view of the occupant or to confuse the occupant thereby causing an accident.

The specific purpose of the present invention is therefore to provide an improved safety device actuating arrangement which is free from such erroneous operation as mentioned above.

The above-mentioned purpose of the invention is accomplished by a safety device actuating arrangement which comprises a power source, at least one safety device actuator for actuating the safety device when energized, a normally open deceleration rate detecting switch for connecting the power source to the actuator so as to energize the actuator when it detects a deceleration rate above a predetermined magnitude, and a normally closed mechanical pressure detecting switch connected in parallel with the actuator and in series with the deceleration rate detecting switch, the mechanical pressure detecting switch being opened when the mechanical pressure detecting switch detects a mechanical pressure being applied to it.

The present invention will appear more clearly from the following detailed description when taken in conjunction with the accompanying drawings, showing by way of example a preferred embodiment of the invention, in which.

Like reference numerals designate like or corresponding parts throughout the figures.

Figure 1:
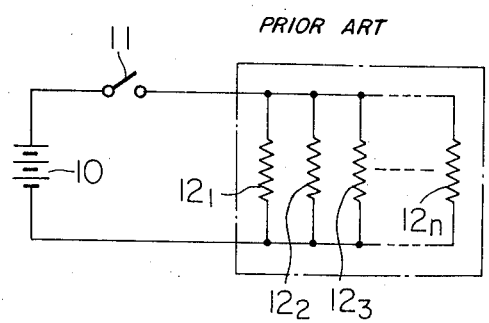
FIG. 1 is a circuit diagram illustrating a conventional safety device actuating arrangement.

Referring now to the drawings and more particularly to FIG. 1 thereof, a conventional safety device actuating arrangement is shown which comprises a d-c power source 10. To one of the terminals of the power source 10 is connected a movable contact of an impact or deceleration rate detecting switch 11 which is arranged to close when it detects an impact or deceleration rate of a magnitude above a predetermined level. A stationary contact of the deceleration detecting switch 11 is connected to one terminal of one or more actuators $12_1$, $12_2$, $12_3$, . . ., $12_n$ connected in parallel with one another. The actuators are arranged to initiate actuation of the corresponding safety devices when they are electrically energized. The other terminal of the parallel connection is connected to the other terminal of the d-c power source 10.

When a deceleration rate above a predetermined magnitude is detected by the switch 11, the detecting switch 11 completes the circuits to supply electric energy to the actuators $12_1$, $12_2$, $12_3$, . . ., $12_n$. The electric energy supplied to the actuators is transduced into thermal energy which ignites initiating agents of the actuators thereby to cause the safety devices to initiate activation.

Figure 2:
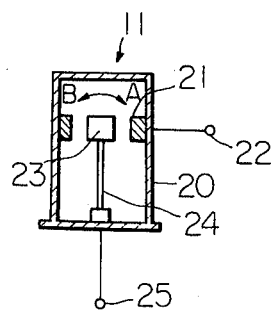
FIG. 2 is a diagram illustrating a typical impact or deceleration detecting switch for a safety device actuating arrangement.

The impact or deceleration rate detecting switch 11 may be arranged as shown in FIG. 2 in which a numeral 20 designates a cylindrical casing which may be fastened onto a suitable portion of the vehicle body. An annular stationary contact 21 is fastened onto the inner wall surface of the cylindrical casing 20 and is electrically connected to a terminal 22. A swingable contact 23 is mounted on the top of an electrically conductive resilient rod 24 which is so fastened at the bottom end thereof on the bottom wall surface of the casing 20 that the swingable contact 23 is spaced from the stationary contact 21 as long as the impact or deceleration rate detected by the switch 11 is below a predetermined magnitude and the contact 23 is oscillated in such a direction as indicated by A or B but not contacting the stationary contact 21. When the switch 11 detects an impact or deceleration rate above a predetermined magnitude the swingable contact 23 contacts the contact 21 to complete the circuit between the terminal 22 and a terminal 25 connected to the rod 24.

It is now to be noted that since the impact or deceleration rate detecting switch 11 of such nature as shown in FIG. 2 will be actuated to close by an impact or deceleration rate caused by great braking force exerted on the motor vehicle even though no collision take place, whereby the actuators $12_1, 12_2, 12_3, \ldots, 12_n$ are unnecessarily energized causing unnecessary or erroneous operation of the safety devices.

Figure 3:
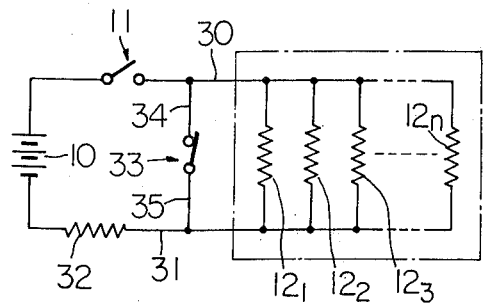
FIG. 3 is a circuit diagram illustrating a safety device actuating arrangement according to the present invention.

In order to solve the abovestated problem encountered by the conventional safety device actuating arrangement, an improved safety device actuating arrangement is provided according to the invention. FIG. 3 illustrates a preferred embodiment of the invention which comprises a d-c power source 10 having one terminal connected to a movable contact of an impact or deceleration rate detecting switch 11. The other terminal of the detecting switch 11 is connected through a line 30 to one terminal of one or more actuators $12_1, 12_2, 12_3, \ldots, 12_n$ which are connected in parallel with one another. The actuator may include a resistor embedded in an initiating agent which is ignited by heat generated in the resistor by current flowing therethrough. The other terminals of the actuators $12_1, 12_2, 12_3, \ldots, 12_n$ are connected through a line 31 to one terminal of a resistor 32 the other terminal of which is connected to the other terminal of the power source 10. A mechanical pressure detecting switch 33 which is normally closed is provided which bypasses the actuators by way of lines 34 and 35. The mechanical pressure detecting switch 33 is arranged to close the circuit of elements 10, 11, 34, 33, 35, 32 and 10 as long as no mechanical pressure is applied thereto but to open the circuit when it detects mechanical pressure being applied thereto because of the collision of the motor vehicle. In order to provide full assurance of operation of the mechanical pressure detecting switch 33, it is preferable to position the switch 33 at a suitable portion of the motor vehicle, such as, the bumper. The mechanical pressure switch 33 does not operate by an impact or deceleration applied to the motor vehicle.

When, in operation, the impact or deceleration rate detecting switch 11 detects an impact or deceleration rate above a predetermined magnitude but no collision takes place, the switch 11 closes but the mechanical pressure detecting switch 33 does not open with the result that no voltage is impressed across the actuators $12_1, 12_2, 12_3, \ldots, 12_n$. In this instance, the resistor 32 prevents an overcurrent from flowing through the power source 10, and the switches 11 and 33. When the motor vehicle collides with an obstruction, the impact or deceleration rate switch 11 will first close and the mechanical pressure detecting switch 33 subsequently opens while the switch 11 remains closed, so that a voltage from the power source is applied across the actuators $12_1, 12_2, 12_3, \ldots, 12_n$, whereby the corresponding safety device actuators are operated. It is now apparent that the mechanical pressure detecting switch 33 is effective for preventing erroneous operation of the safety device actuating arrangement.

Figure 4:
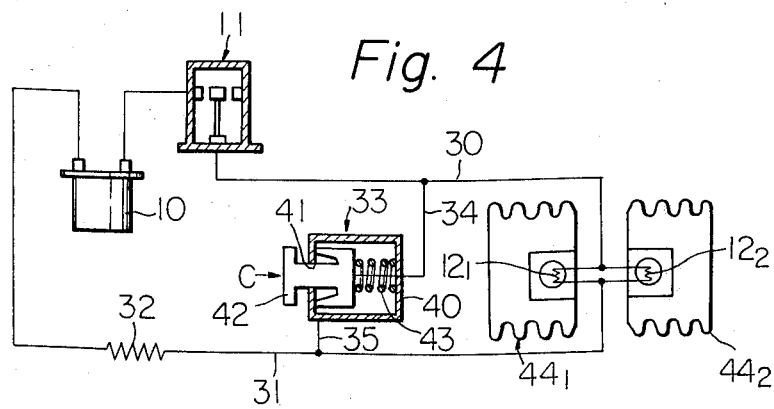
FIG. 4 is a sectional view diagrammatically illustrating the safety device actuating arrangement shown in FIG. 3.

In FIG. 4, there is diagrammatically illustrated the safety device actuating arrangement of the circuit of FIG. 3, in which the detecting switch 11 is of the construction shown in FIG. 2. The mechanical pressure detecting switch 33 includes an electrically conductive casing 40 with an aperture 41 at one end wall. A movable rod 42 made of conductive material is slidably coupled with the casing 40 through the aperture 41 and pressed onto the bottom wall by a resilient member 43 which is interposed between the top end of the movable rod 42 and the opposite end wall of the casing 40. The movable rod 42 connects to a lead line 34 while the resilient member 43 is isolated from either the rod 42 or casing 40. The casing 40 is electrically connected to the line 31 by way of the line 35. When, being thus arranged, a mechanical pressure as indicated by an arrow C is applied to the movable rod 42, the rod 42 moves to the right against the spring force of the resilient member 43 so as to break the connection between the lines 34 and 35. In this case, it is exemplified that a pair of safety devices $44_1$ and $44_2$ are connected to this actuating arrangement. The actuators $12_1$ and $12_2$ are, for example, associated with the safety devices $44_1$ and $44_2$. As shown in this figure, the actuators $12_1$ and $12_2$ respectively include each a resistor embedded in the initiating agent, so that the actuators cause the initiating agent to explode.

It should be now appreciated that the safety device actuating arrangement according to the present invention does not erroneously actuate the safety devices even if a sudden change in the velocity of the motor vehicle takes place due to braking or the like but rapidly actuates the safety devices when a collision of the motor vehicle takes place.

What is claimed is:

1. A safety device actuating arrangement for actuating a safety device of a motor vehicle, which comprises:
    at least one actuator for the safety device when energized;
    a normally-open deceleration rate detecting switch for connecting said actuator to a power source so as to energize said at least one actuator when it is subjected to a deceleration rate greater than a predetermined magnitude; and
    a normally-closed mechanical pressure detecting switch connected in parallel with said at least one actuator and in series, through a resistor, with said deceleration rate detecting switch, said mechanical pressure detecting switch being opened when a mechanical pressure is applied thereto.

* * * * *